(12) United States Patent
Stefes (10) Patent No.: US 12,441,461 B2
(45) Date of Patent: Oct. 14, 2025

(54) DRAG REDUCTION SYSTEM FOR AN AIRCRAFT

(71) Applicant: Airbus Operations GmbH, Hamburg (DE)

(72) Inventor: Bruno Stefes, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/877,682

(22) Filed: Jul. 29, 2022

(65) Prior Publication Data

US 2023/0029560 A1 Feb. 2, 2023

(30) Foreign Application Priority Data

Jul. 30, 2021 (EP) .................................... 21188955

(51) Int. Cl.
*B64C 21/04* (2023.01)
*B64C 39/10* (2006.01)

(52) U.S. Cl.
CPC ........ *B64C 21/04* (2013.01); *B64C 2039/105* (2013.01); *B64C 2230/06* (2013.01)

(58) Field of Classification Search
CPC ....... B64C 21/02; B64C 21/025; B64C 21/04; B64C 21/06
See application file for complete search history.

(56) References Cited

U.S. PATENT DOCUMENTS

| | | | |
|---|---|---|---|
| 3,452,553 A * | 7/1969 | Leonard .................. | B64C 21/04 165/60 |
| 4,802,642 A | 2/1989 | Mangiarotty | |
| 5,167,387 A * | 12/1992 | Hartwich .............. | B64C 21/025 244/200 |
| 5,939,800 A * | 8/1999 | Artinian ................. | B64D 13/06 307/64 |
| 6,368,059 B1 * | 4/2002 | Maines ................. | B64C 21/025 416/42 |
| 2004/0129839 A1 * | 7/2004 | Patel ................... | F16K 99/0051 244/204 |
| 2009/0210103 A1 * | 8/2009 | Cook .................... | B64C 23/005 701/3 |
| 2017/0056913 A1 * | 3/2017 | Griffin ............... | B05B 17/0653 |
| 2019/0092456 A1 * | 3/2019 | Sawyers ................. | B64C 3/185 |

FOREIGN PATENT DOCUMENTS

| | | |
|---|---|---|
| CN | 101348170 | 8/2010 |
| CN | 107933895 | 12/2020 |
| WO | 2019/125141 | 6/2019 |
| WO | WO-2019125141 A1 * | 6/2019 |

OTHER PUBLICATIONS

Extended European Search Report for EP Application No. 21188955.5 dated Jan. 4, 2022, 10 pages.

* cited by examiner

*Primary Examiner* — Timothy D Collins
*Assistant Examiner* — Eric Acosta
(74) *Attorney, Agent, or Firm* — Nixon & Vanderhye P.C.

(57) ABSTRACT

A drag reduction system an aircraft having an aircraft component is disclosed including a skin panel having an inner surface and an outer surface for contact with an ambient flow, the outer surface includes an upstream area for laminar flow and a downstream area for turbulent flow and/or transitional flow, the skin panel includes a plurality of micro pores for blowing air from inside the aircraft component into the ambient flow.

16 Claims, 6 Drawing Sheets

DRAG REDUCTION SYSTEM FOR AN AIRCRAFT

CROSS REFERENCE TO RELATED APPLICATION

This application claims priority to and incorporates by reference European Application Number EP 21188955.5, filed Jul. 30, 2021.

BACKGROUND

1. Field of the Invention

The present invention relates to a drag reduction system for an aircraft, in particular a micro blowing (MB) system for an aircraft. A further aspect of the invention relates to an aircraft comprising such a drag reduction system.

2. Description of Related Art

The drag reduction system comprises an aircraft component, in particular a wing, horizontal tail plane (HTP), vertical tail plane (VTP), fuselage, blended wing body, or a part or sub-component of the afore-mentioned, comprising a skin panel having an inner surface directed to the inside of the aircraft component, and an outer surface for contact or in contact with an ambient flow. The outer surface comprises an upstream area and a downstream area. The upstream area is configured for laminar flow, i.e. laminar boundary layer, and is preferably located in the area of the leading edge or nose of the aircraft component. The downstream area is located downstream from the upstream area with respect to the ambient flow, and is configured for turbulent flow, i.e. turbulent boundary layer, and/or for transitional flow from laminar to turbulent. The skin panel comprises a plurality of micro pores for blowing air from inside the aircraft component into the ambient flow to affect the boundary layer.

Similar drag reduction systems are known in the art of hybrid laminar flow control (HLFC) systems where micro pores are provided in the leading edge area of an airfoil to establish or enhance laminar flow by sucking in air from the boundary layer through the micro pores into a plenum inside the airfoil. Some HLFC systems have the ability to reverse the flow through the micro pores and blow air from inside the airfoil out into the ambient flow in order to clean the micro pores from ice and contaminants. However, the blowing function of HLFC system is carried out only for short time intervals and does not have a direct aerodynamic benefit. Also, HLFC systems are provided only in the laminar leading edge area of the airfoil but not in an area further downstream where the boundary layer is turbulent or transitional from laminar to turbulent. Turbulent boundary layer causes an essential part of the overall drag of an aircraft component.

Further, micro blowing (MB) technology is known generally to reduce drag of a moving component by blowing out air through micro pores into the boundary layer of the ambient flow.

SUMMARY

The present disclosure encompasses a drag reduction system that can further reduce the drag of the aircraft component.

The micro pores are arranged in the downstream area of the outer surface of the skin panel to affect the turbulent and/or transitional boundary layer, specifically to increase the boundary layer thickness and reduce the velocity gradient of the ambient flow next to the outer surface. In such a way, the drag caused by the turbulent boundary layer in the downstream area of the outer surface of the aircraft component can be essentially reduced.

According to an exemplary embodiment, the velocity of the air blowing out of the micro pores, may be measured at the level of the outer surface, is between 0.05% and 0.5%, may be between 0.1% and 0.3%, most preferred about 0.2% of the velocity of the ambient flow above the boundary layer, i.e. of the free stream. This relatively slow velocity range is sufficient for largely reducing the drag of the turbulent boundary layer, and at the same time requires only a relatively low pressure range in the plenum below the pores, which enables a simple design of the system and the pressure generation.

According to an exemplary embodiment, the micro pores have a diameter of between 10 µm and 100 µm, may be between 40 µm and 80 µm, or may be about 60 µm. Such a diameter range produces a blow out of air that enables a very efficient drag reduction.

According to an exemplary embodiment, the micro pores are arranged in the downstream area of the outer surface of the skin panel with a porosity of between 5% and 30%, preferably between 10% and 20%, most preferred about 15%. The porosity preferably relates to the area of the micro pores relative to the entire downstream area or the entire part of the downstream area in which the micro pores are provided. Such a porosity range produces a blow out of air that enables a very efficient drag reduction and at the same time secures structural integrity of the porous skin panel.

According to an exemplary embodiment, the skin panel has a multilayer structure, in particular a sandwich structure, comprising an outer layer, an inner layer and a core assembly sandwiched between the outer and inner layers. The outer layer may comprise the micro pores and might be formed from titanium or steel sheet. The core assembly comprises a plurality of stiffeners supporting the outer layer against the inner layer and spaced from one another by cavities. The micro pores may form a fluid connection between the cavities and the ambient flow. The inner layer might be formed from FRP and might be integrally with the stiffeners. The inner layer may comprises a plurality of holes, such as throttle holes, forming a fluid connection between the cavities and the inside of the aircraft component, and may be between the cavities and a common plenum surrounded by the skin panel. Such a multi-layered structure provides beneficial mechanical properties and at the same time allows to adjust the pressure of the air to be blown out through the pores as required.

According to an exemplary embodiment, the micro pores are arranged within the downstream area of the outer surface of skin panel in the form of one or more strips, i.e. elongate arrays, may be extending in an elongate manner transverse to a direction of the ambient flow during normal, straight cruise flight conditions. The strips may extend in parallel to a leading edge of the aircraft component or perpendicular to the direction of the ambient flow under normal, straight cruise flight conditions. Such strips of micro pores enable a very efficient drag reduction and at the same time require a minimum of the skin panel to be perforated and consequently a minimum of required pressurized air to be provided to the micro blowing system.

In particular, the two or more strips of micro pores may be arranged behind one another in the direction of the ambient flow during normal, straight cruise flight conditions, may be in parallel to one another. Such an arrangement allows for a very efficient drag reduction with a minimum porous surface.

According to an exemplary embodiment, the aircraft component comprises a flow control system, which may be a laminar flow control system, in particular a HLFC system, including a plurality of micro pores arranged in the upstream area, preferably in the leading edge area, of the outer surface of the skin panel. The flow control system is configured for sucking air from the ambient flow through the micro pores in the upstream area into the aircraft component, preferably into the plenum. In such a way, the aircraft component might comprise both the HLFC system in the upstream area and the MB system in the downstream area. By such a combination of the HLFC system and the MB system drag reduction can be additionally enhanced. However, it is also possible that the aircraft component including the drag reduction system does not comprise a flow control system but is rather formed and configured for natural laminar flow (NLF) in the upstream area.

According to an exemplary embodiment, inside the aircraft component a plenum, preferably a common plenum, is provided, preferably next to the inner surface of the skin panel, for pressurized air to be discharged through the micro pores to the ambient flow. Such a plenum may function as a pressure chamber to control the pressure and velocity of the air discharging through the micro pores.

The plenum may be in fluid connection or configured for fluid connection to a compressor, for example a pump, an engine compressor, or an HLFC pump, to provide the pressurized air, for example in the form of compressed air or bleed air. An extra pump for the MB system allows to adjust the pressure exactly as required. Using bleed air from an engine does not require an extra pump. Similar applies when exhaust pressurized air from an HLFC pump is used.

Additionally or alternatively, the plenum may be in fluid connection or configured for fluid connection to a cabin air source, such as a cabin air ejector, to provide the pressurized air in the form of cabin air, preferably used cabin air. Using cabin air as pressurized air is very efficient as no extra pump is required and the cabin air would otherwise be exhausted to the ambient flow.

Additionally or alternatively, the plenum may be in fluid connection or configured for fluid connection to an ambient air inlet, such as a ram air inlet to provide the pressurized air in the form of ambient air and ram air, respectively. The ambient air might be mixed with cabin air or compressor air to achieve the desired pressure level, or might be used alone as pressurized air in the form of ram air provided e.g. by a passive ram air inlet. Using ambient air to pressurized the MB system is very simple, can be realized entirely passive and can be efficiently combined with other options of pressurized air.

Additionally or alternatively, the plenum may be in fluid connection or configured for fluid connection to an air exhaust of a flow control system, preferably of an HLFC system, to provide the pressurized air preferably in the form of HLFC exhaust air that has been sucked in from the ambient flow. Using HLFC exhaust air also relates to a very efficient option of providing pressurized air, since HLFC exhaust air is produced anyway if an HLFC system is present and would otherwise be exhausted into the ambient air.

According to an exemplary embodiment, the aircraft component relates to an airfoil, such as a wing, a horizontal tail plane (HTP), or a vertical tail plane (VTP), or to a component of such an airfoil, or relates to a fuselage or a blended wing body. In all cases micro pores are provided at the upper surface or lower surface or at the left or right surface, spaced from the leading edge or nose and are arranged in strips parallel to one another and transverse to the normal cruise flight direction and ambient air direction, respectively. In case of the aircraft component being a wing, the micro pores may be provided in the lower surface, i.e. the pressure side, arranged in the form of two or more parallelly spaced strips extending preferably in parallel to the leading edge of the wing. However, additional or alternative strips of micro pores might also be arranged at the upper surface, i.e. the suctions side, of the wing. In case of the aircraft component being a fuselage or a blended wing body, the micro pores are preferably provided in the upper surface arranged in the form of several parallelly spaced strips extending behind one another perpendicular to a fuselage longitudinal axis of the fuselage or blended wing body and preferably perpendicular to a flight direction under normal, straight cruise flight conditions. In case of engines being provided on the fuselage or blended wing body and configured for boundary layer ingestion (BLI), strips of micro pores might be arranged ahead of the engine inlet to enhance the efficiency of a BLI configuration.

A further aspect of the present invention relates to an aircraft comprising a drag reduction system according to any of the embodiment described above. Features and effects described above in connection with the drag reduction system apply vis-à-vis also in case of the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
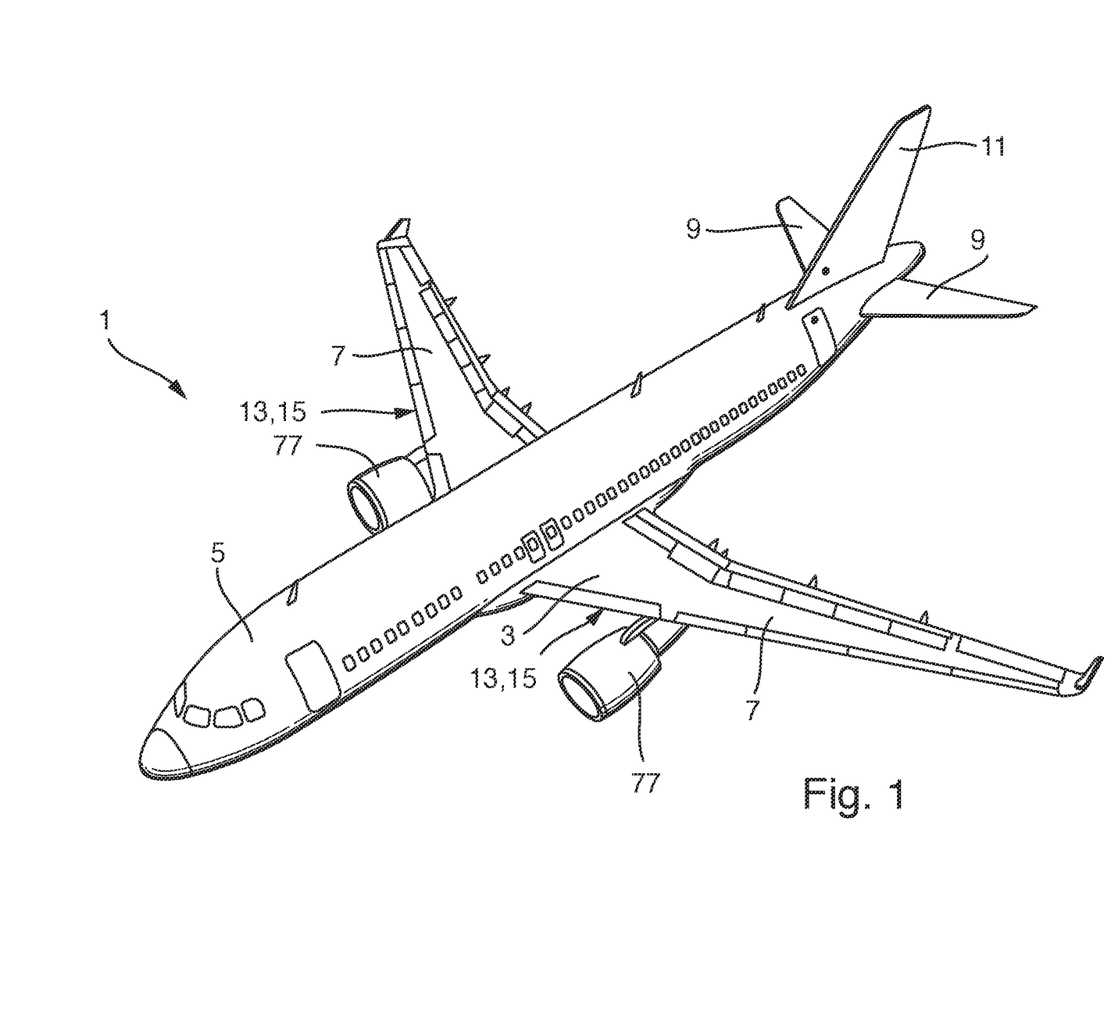
FIG. 1 is a perspective view of an aircraft according to an exemplary embodiment.

In FIG. 1 an aircraft 1 according to an embodiment of the invention is shown. The aircraft 1 comprises various aircraft components 3 in the form of a fuselage 5, wings 7, a horizontal tail plane 9, a vertical tail plane 11, or in the form of parts of the afore-mentioned. Each wing 7 comprises a drag reduction system 13 in the form of a micro blowing (MB) system 15, as described hereinafter.

Figure 2:
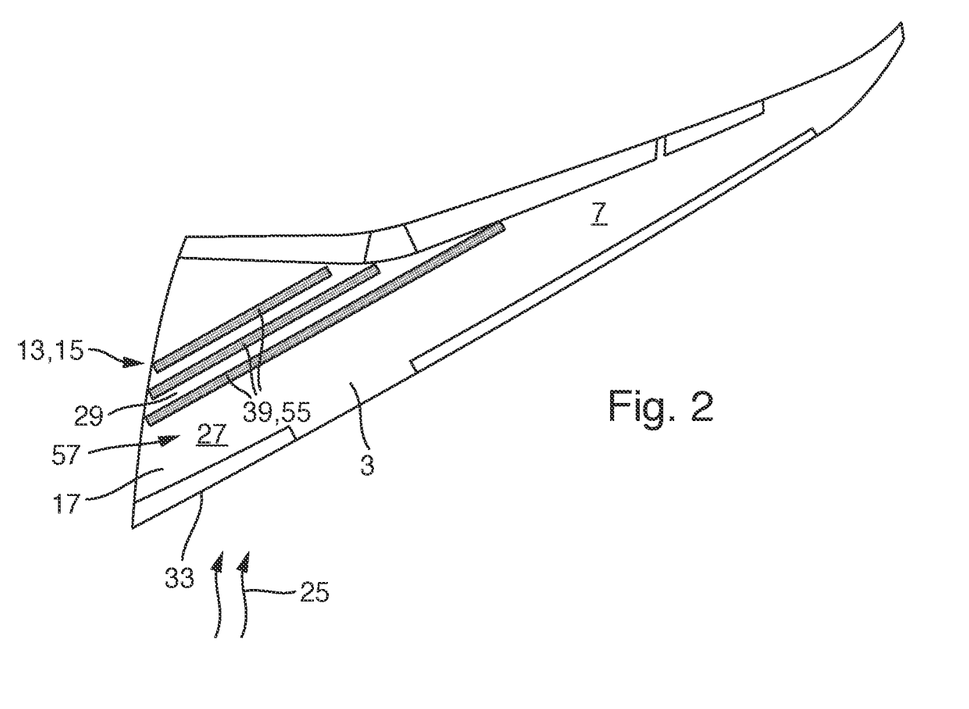
FIG. 2 is a detailed view from below of the wing of the aircraft shown in FIG. 1.
Figure 3:
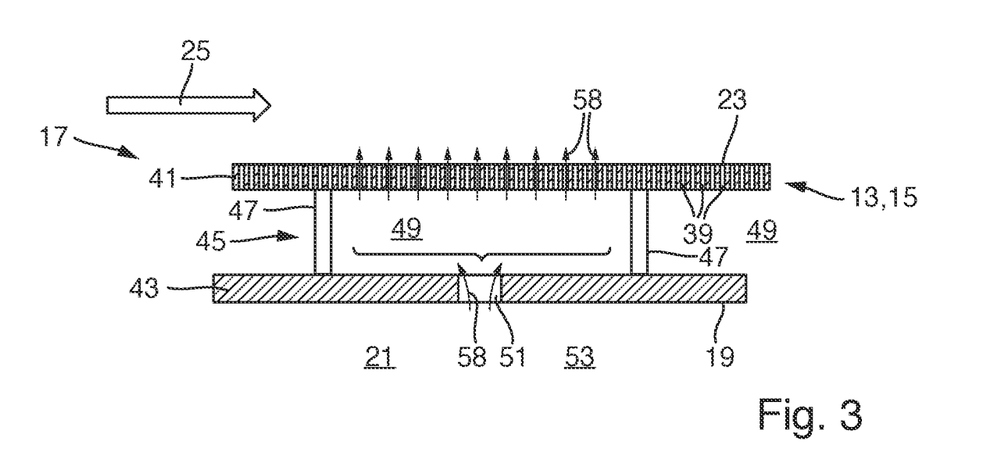
FIG. 3 is a cross sectional view of the skin panel of the aircraft component shown in FIG. 2.
Figure 4:
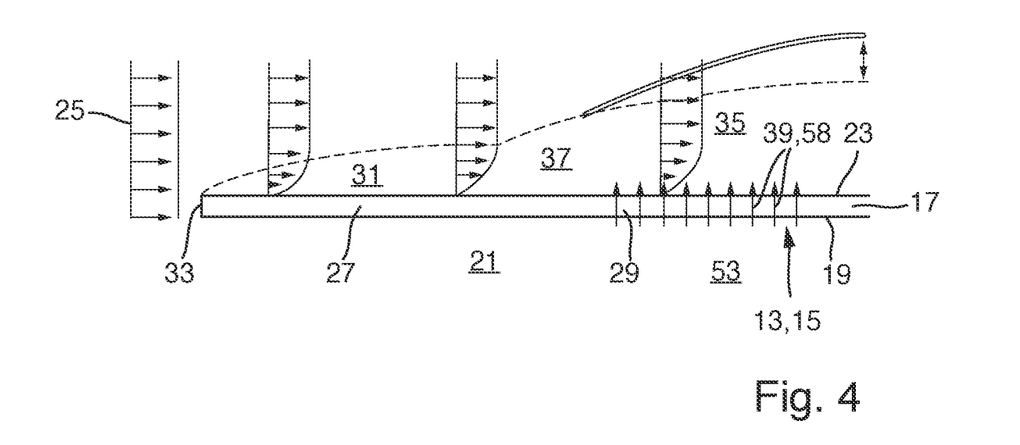
FIG. 4 is a diagram indicating the velocity profile of the laminar and turbulent boundary layer along the skin panel of the aircraft component.

An exemplary wing 7 including a drag reduction system 13 is shown in more detail in FIG. 2. The drag reduction system 13 comprises an aircraft component 3 in the form of a part of the wing 7 comprising a skin panel 17 having an inner surface 19 directed to the inside 21 of the aircraft component 3, and an outer surface 23 for contact or in contact with an ambient flow 25. A cross section of the skin panel 17 is shown in FIG. 3. The outer surface 23 comprises an upstream area 27 and a downstream area 29. The upstream area 27 is configured for laminar flow, i.e. laminar boundary layer 31, and is located in the area of the leading edge 33 of the aircraft component 3. The downstream area 29 is located downstream from the upstream area 27 with respect to the ambient flow 25, and is configured for turbulent flow, i.e. turbulent boundary layer 35, and/or for transitional flow from laminar to turbulent, i.e. transitional boundary layer 37. The upstream and downstream areas 27, 29 and the respective laminar and turbulent boundary layers 31, 35 are schematically illustrated in FIG. 4. The skin panel 17 comprises a plurality of micro pores 39 for blowing air from inside the aircraft component 3 into the ambient flow 25 to affect the boundary layer.

As shown in FIGS. 2 and 4, the micro pores 39 are arranged in the downstream area 29 of the outer surface 23 of the skin panel 17 to advantageously affect the turbulent and/or transitional boundary layer 35, 37 in the downstream area 29 to reduce drag. The velocity of the air blowing out of the micro pores 39 measured at the level of the outer surface 23 is between 0.1% and 0.3% of the velocity of the ambient flow 25 above the boundary layer 31, 35, i.e. of the free stream. The micro pores 39 have a diameter of between 40 µm and 80 µm. The micro pores 39 are arranged in the downstream area 29 of the outer surface 23 of the skin panel 17 with a porosity of between 10% and 20%.

As shown in FIG. 3, the skin panel 17 has a multilayer structure, in the present embodiment a sandwich structure, comprising an outer layer 41, an inner layer 43 and a core assembly 45 sandwiched between the outer and inner layers 41, 43. The outer layer 41 comprises the micro pores 39 and is formed from titanium or steel sheet. The core assembly 45 may comprise a plurality of stiffeners 47 supporting the outer layer 41 against the inner layer 43 and spaced from one another by cavities 49. The micro pores 39 form a fluid connection between the cavities 49 and the ambient flow 25. The inner layer 43 is formed from fiber reinforced plastic (FRP) and is formed integrally with the stiffeners 47. The inner layer 43 comprises a plurality of holes 51, such as throttle holes, forming a fluid connection between the cavities 49 and a common plenum 53 inside the aircraft component 3 and surrounded by the skin panel 17.

As shown in FIG. 2, the micro pores 39 are arranged within the downstream area 29 of the outer surface 23 of the skin panel 17 in the form of strips 55, i.e. elongate arrays, extending in an elongate manner transverse to a direction of the ambient flow 25 during normal, straight cruise flight conditions, and extending in parallel to a leading edge 33 of the aircraft component 3. In the embodiment of FIG. 2, three strips 55 of micro pores 39 are arranged behind one another in the direction of the ambient flow 25 in parallel to one another at the lower surface 57 of the aircraft component 3, i.e. at the pressure side of the wing 7.

As shown in FIG. 3, inside the aircraft component 3 the common plenum 53 is provided next to the inner surface 19 of the skin panel 17 for pressurized air 58 to be discharged through the micro pores 39 to the ambient flow 25. The plenum 53 serves as a pressure chamber to control the pressure and velocity of the air discharging through the micro pores 39. There are various options how the plenum 53 can be pressurized according to the invention. Four options are indicated in FIGS. 5 to 8 by way of example.

Figure 5:
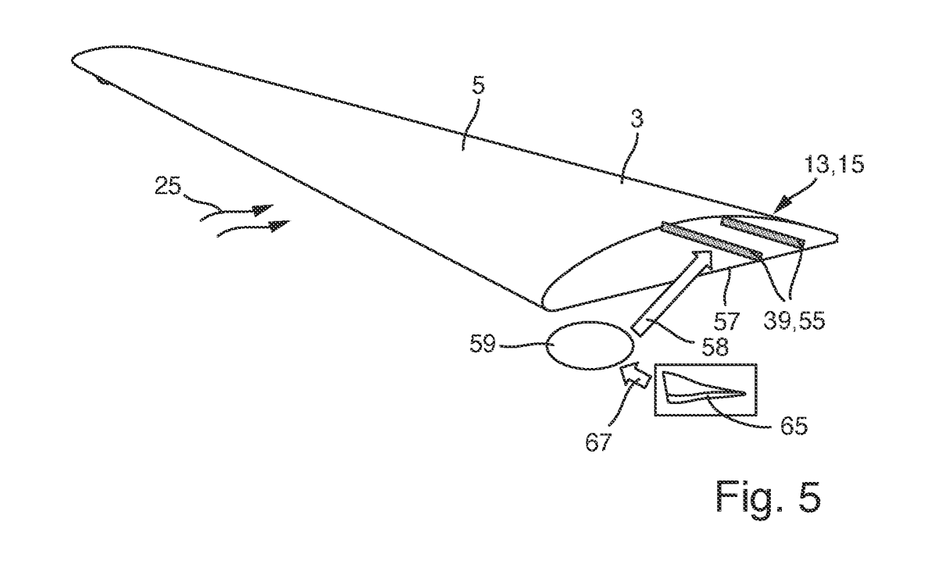
FIG. 5 is a perspective view of a wing according to a further embodiment of the invention.

In the embodiment shown in FIG. 5, the plenum 53 is in fluid connection or configured for fluid connection to a compressor 59, in the present embodiment a separate pump configured for micro blowing, to provide the pressurized air 58. Air from the ambient flow is taken in through an air inlet, e.g. a ram air inlet, and passed to the pump, which in turn provides pressurized air 58 to the plenum at the pressure level required for micro blowing.

Figure 6:
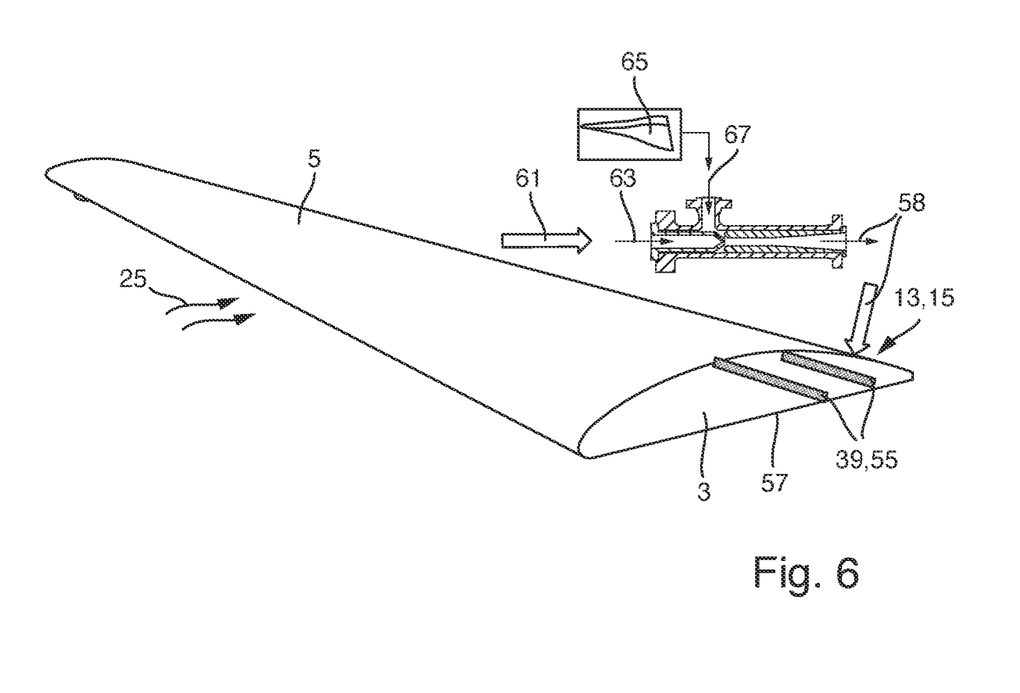
FIG. 6 is a perspective view of a wing according to an exemplary embodiment of the invention.

The embodiment shown in FIG. 6 differs from the embodiment shown in FIG. 5 by instead of being connected to a compressor 59 the plenum 53 is in fluid connection to a cabin air source 61, namely a cabin air ejector, to provide the pressurized air 58 in the form of used cabin air 63. Additionally, the plenum 53 is in fluid connection to an ambient air inlet 65, such as a ram air inlet, to provide pressurized air 58 in the form of ambient air 67 or ram air. In the present embodiment, the ambient air 67 is mixed with the cabin air 63 to achieve the desired pressure level.

Figure 7:
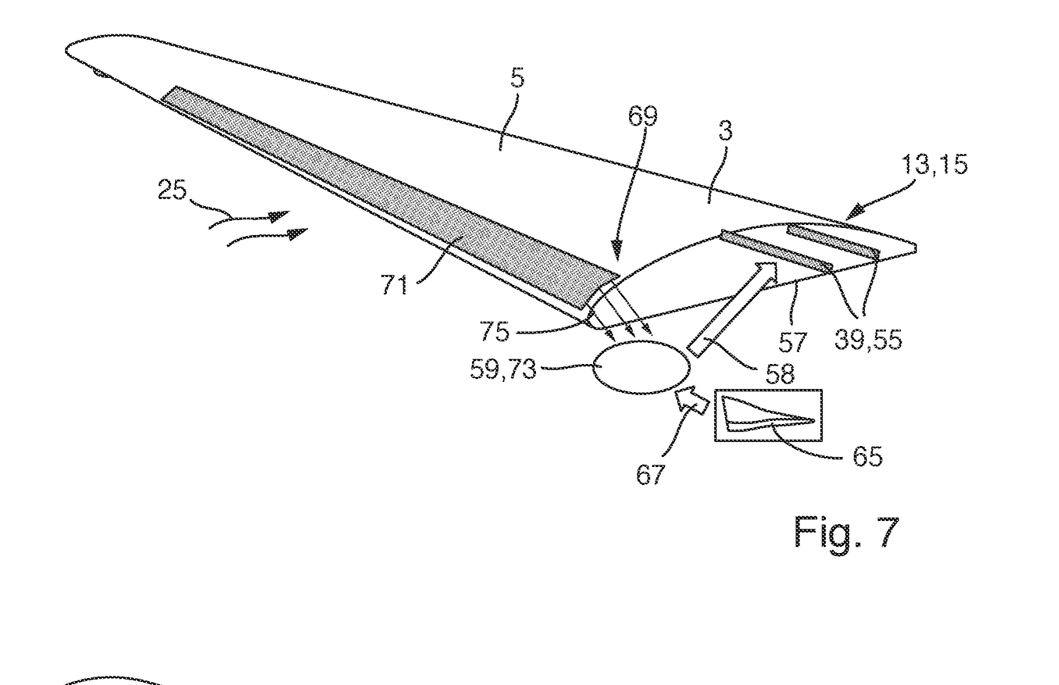
FIG. 7 is a perspective view of a wing according to an exemplary embodiment of the invention.
Figure 8:
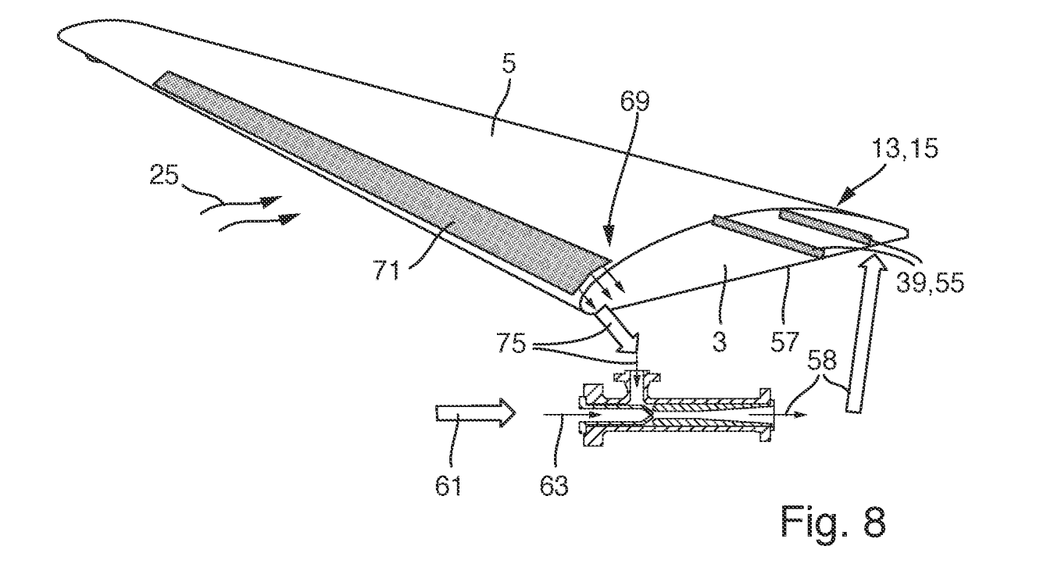
FIG. 8 is a perspective view of a wing according to an exemplary embodiment of the invention.

The embodiments shown in FIGS. 7 and 8 differ from the embodiments shown in FIGS. 5 and 6 in that the aircraft component 3 comprises a flow control system 69, specifically a HLFC system, including a plurality of micro pores 71 arranged in the upstream area 27, i.e. in the leading edge area, of the outer surface 23 of the skin panel 17. The flow control system 69 is configured for sucking air from the ambient flow 25 through the micro pores 71 in the upstream area 27 into the plenum 53 of the aircraft component 3. In such a way, the wing 7 comprises both the flow control system 69 in the upstream area 27 and the MB system 15 in the downstream area 29.

In the embodiment shown in FIG. 7, the suction for the flow control system 69 is created by a multi-purpose pump 73 that is also fluidly connected to the plenum 53 of the micro blowing system 15, so that air sucked in through the HLFC micro pores 71 in the upstream area 27 by the multi-purpose pump 73, i.e. HLFC exhaust air 75, is subsequently provided as pressurized air 58 to the plenum 53 of the micro blowing system 15 and finally discharged through the MB micro pores 39 in the downstream area 29. Additionally, ambient air 67 taken in through an ambient air inlet 65 and ram air inlet, respectively, is passed to the multi-purpose pump 73 to mix with the suction air from the flow control system 69, in case that the mass flow of air required for micro blowing is higher compared to the air mass flow provided by the flow control system 69.

In the embodiment shown in FIG. 8, the plenum 53 is in fluid connection to both a cabin air source 61, namely a cabin air ejector, and an air exhaust of a flow control system 69, i.e. an HLFC system, to provide the pressurized air 58 as a mixture of used cabin air 63 and HLFC exhaust air 75 that has been sucked in from the ambient flow 25. Using HLFC exhaust air 75 and exhaust cabin air 63 relates to a very efficient option of providing pressurized air 58, since both are produced anyway and would otherwise be exhausted into the ambient flow 25. Also, no extra pump is required.

Figure 9:
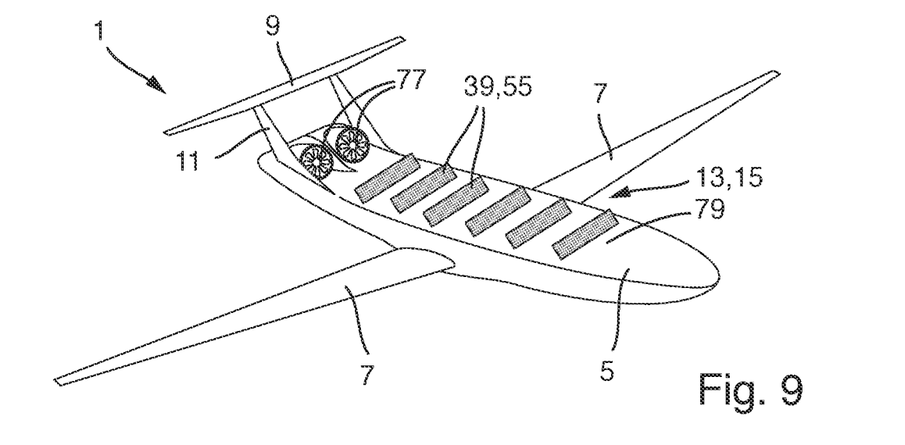
FIG. 9 is a perspective view of an aircraft according to an exemplary embodiment of the invention, having a drag reduction system arranged at the fuselage.
Figure 10:
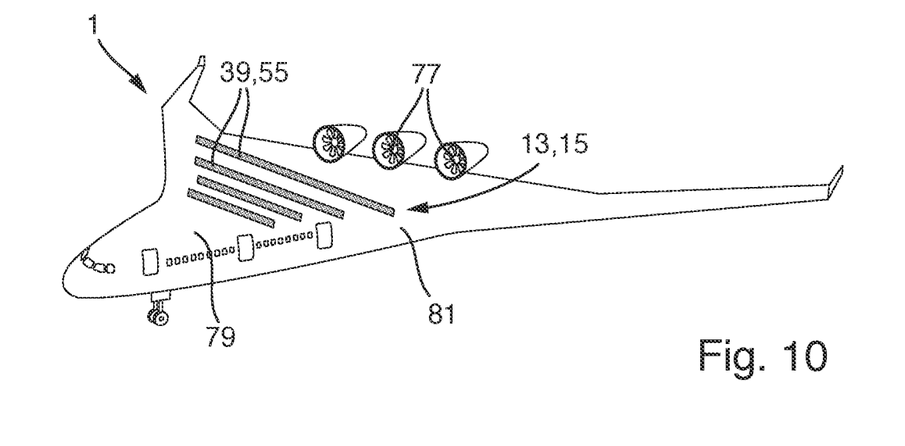
FIG. 10 is a perspective view of an aircraft according to an exemplary embodiment of the invention, having a drag reduction system arranged at the blended wing body.

The embodiments shown in FIGS. 9 and 10 relate to alternative types of aircraft 1 both having wide bodies and configured for boundary layer ingestion (BLI). The aircraft shown in FIG. 9 has a wide body fuselage 5, which represents the aircraft component 3 in this embodiment, and has its engines 77 at the rear upper end of the fuselage 5, so that boundary layer 31, 35, 37 building up along the upper surface 79 of the fuselage 5 can be ingested into the engines 77. In this embodiment, the drag reduction system 13 is provided at the upper surface 79 of the fuselage 5 in the form of several strips 55 of micro pores 39 arranged parallelly spaced behind one another perpendicular to longitudinal axis of the fuselage 5 and aircraft 1 and perpendicular to the direction of the ambient flow 25 during normal, straight flight conditions. By this arrangement boundary layer ingestion can be supported by the drag reduction system 13. The embodiment shown in FIG. 10 differs from the embodiment shown in FIG. 9 only by the aircraft 1 instead of having a fuselage 5 being formed as a blended wing body 81, wherein the strips 55 of micro pores 39 for the drag reduction system 13 are arranged at the upper surface 79 of the blended wing body 81. The blended wing body 81 or a part of the same here forms the aircraft component 3.

By the drag reduction system 13 according to the invention, the turbulent and/or transitional boundary layer 35, 37 is advantageously affected to reduce the drag caused by the turbulent flow in the downstream area 29 of the outer surface 23 of the aircraft component 3. Specifically, by blowing out air through the micro pores 39 in the downstream area 29 the boundary layer thickness can be increased and the velocity gradient of the ambient flow 25 next to the outer surface 23 can be reduced.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A drag reduction system for an aircraft, comprising:
an aircraft component comprising a skin panel having an inner surface and an outer surface for contact with an ambient flow,
wherein the outer surface comprises an upstream area for laminar flow and a downstream area for turbulent flow and/or transitional flow,
wherein the skin panel comprises
   a plurality of first micro pores for blowing air from inside the aircraft component into the ambient flow, the first micro pores being arranged in the downstream area of the outer surface of the skin panel,
   a plurality of second micro pores arranged in the upstream area of the outer surface of the skin panel,
wherein the system comprises a hybrid laminar flow control (HLFC) system configured to suction boundary layer air from the ambient flow through the second micro pores and direct the suctioned air into an HLFC exhaust path,
wherein inside the aircraft component a plenum is provided for pressurized air to be discharged through the second micro pores,
wherein the plenum is in fluid connection to a cabin air ejector to provide the pressurized air from the cabin,
wherein the plenum is also in fluid connection to a ram air inlet to provide the pressurized air in form of ambient air,
wherein the ambient air is mixed with the cabin air,
wherein the plenum is further connected to a multi-purpose pump that is also connected to an air exhaust of the hybrid laminar flow control (HLFC) system,
wherein the multi-purpose pump is disposed downstream of the HLFC system and is fluidly connected to the air exhaust, and
wherein the multi-purpose pump is configured to receive the HLFC exhaust air from the air exhaust and configured to mix HLFC exhaust air with the cabin air and ambient air in the plenum.

2. The drag reduction system according to claim 1, wherein the velocity of the air blowing out of the first micro pores is between 0.05% and 0.5% of the velocity of the ambient flow above the boundary layer.

3. The drag reduction system according to claim 1, wherein the first micro pores have a diameter of between 10 µm and 100 µm.

4. The drag reduction system according to claim 1, wherein the first micro pores are arranged in the downstream area of the outer surface of the skin panel with a porosity of between 5% and 30%.

5. The drag reduction system according to claim 1, wherein the skin panel has a multilayer structure comprising an outer layer, an inner layer and a core assembly sandwiched between the outer and inner layers,
wherein the outer layer comprises the first micro pores,
wherein the core assembly comprises a plurality of stiffeners spaced from one another by cavities,
wherein the first micro pores form a fluid connection between the cavities and the ambient flow, and
wherein the inner layer comprises a plurality of holes forming a fluid connection between the cavities and the inside of the aircraft component.

6. The drag reduction system according to claim 1, wherein the first micro pores are arranged within the downstream area of the outer surface of skin panel in the form of one or more strips extending transverse to a direction of the ambient flow.

7. The drag reduction system according to claim 6, wherein two or more strips of first micro pores are arranged behind one another in the direction of the ambient flow.

8. The drag reduction system according to claim 1, wherein the plenum is in fluid connection or configured for fluid connection to a compressor to provide the pressurized air.

9. The drag reduction system according to claim 1, wherein the plenum is in fluid connection or configured for fluid connection to an air exhaust of a flow control system to provide the pressurized air.

10. The drag reduction system according to claim 1, wherein aircraft component relates to an airfoil, such as a wing, a horizontal tail plane, or a vertical tail plane, or a component of such an airfoil, or relates to a fuselage or a blended wing body.

11. An aircraft comprising a drag reduction system according to claim 1.

12. The drag reduction system according to claim 1, wherein the velocity of the air blowing out of the first micro pores is between 0.1% and 0.3% of the velocity of the ambient flow above the boundary layer.

13. The drag reduction system according to claim 1, wherein the first micro pores have a diameter of between 40 µm and 80 µm.

14. The drag reduction system according to claim 1, wherein the first micro pores are arranged in the downstream area of the outer surface of the skin panel with a porosity of between 10% and 20%.

15. The drag reduction system according to claim 1, wherein the first micro pores have a diameter of 60 μm.

16. The drag reduction system according to claim 1, wherein the first micro pores are arranged in the downstream area of the outer surface of the skin panel with a porosity of 15%.

* * * * *